United States Patent [19]

Ledebuhr

[11] Patent Number: 4,826,311
[45] Date of Patent: May 2, 1989

[54] PRISM ASSEMBLY WITH THREE PERISCOPES AND PROJECTION LENSES FOR A SINGLE LIGHT VALVE FULL-COLOR PROJECTOR

[75] Inventor: Arno G. Ledebuhr, Fullerton, Calif.

[73] Assignee: Hughes Aircraft Company, Los Angeles, Calif.

[21] Appl. No.: 110,068

[22] Filed: Oct. 15, 1987

Related U.S. Application Data

[63] Continuation of Ser. No. 77,045, Jul. 24, 1987, abandoned, which is a continuation of Ser. No. 774,109, Sep. 9, 1985, abandoned.

[51] Int. Cl.$^4$ .......................... G03B 21/00; G02F 1/13
[52] U.S. Cl. ....................................... 353/31; 353/33; 353/122; 350/331 R
[58] Field of Search ...................... 353/31, 33, 34, 94, 353/99, 122; 350/331 R, 337, 338, 394, 395, 400–403, 408; 358/60, 61

[56] References Cited

U.S. PATENT DOCUMENTS

| | | |
|---|---|---|
| 944,787 | 12/1909 | Jumeaux ................................ 353/33 |
| 973,961 | 10/1910 | Oliver ................................... 353/33 |
| 1,857,441 | 5/1932 | De Francisco ...................... 353/33 |
| 2,028,485 | 1/1936 | Wright ................................. 353/34 |
| 4,127,322 | 11/1978 | Jacobson et al. .................... 353/31 |
| 4,150,396 | 4/1979 | Hareng et al. ....................... 358/60 |
| 4,425,028 | 1/1984 | Gagnon et al. ...................... 353/31 |
| 4,461,542 | 7/1984 | Gagnon ................................ 353/31 |
| 4,552,441 | 11/1985 | Dewey ................................. 353/31 |

Primary Examiner—William A. Cuchlinski, Jr.
Assistant Examiner—Patrick R. Scanlon
Attorney, Agent, or Firm—A. W. Karambelas

[57] ABSTRACT

A full-color projector system is disclosed, wherein a single light valve is employed to modulate red, green and blue illumination beams in accordance with the respective primary color components of the image. Separate but proximately located red, green and blue output projection beams are provided by a prism assembly. First, second and third periscopes are provided to separate the projection beams at the output of the prism assembly and direct the respective projection beams into first, second and third teleconcentric projection lens for convergence at a projection aperture.

9 Claims, 5 Drawing Sheets

PRISM ASSEMBLY WITH THREE PERISCOPES AND PROJECTION LENSES FOR A SINGLE LIGHT VALVE FULL-COLOR PROJECTOR

CROSS REFERENCE TO RELATED APPLICATIONS

This application is a continuation of Ser. No. 077,045 filed July 24, 1987, which is a continuation of Ser. No. 774,109, filed Sept. 9, 1985, both now abandoned.

BACKGROUND OF THE INVENTION

The invention relates to liquid crystal light valve projectors adapted to provide full color imagery.

The liquid crystal light valve is frequently employed in high quality large screen projectors. The reflective mode liquid crystal light valve is a thin film, multilayer structure comprising a liquid crystal layer, a dielectric mirror, a light blocking layer, and a photoresponsive layer sandwiched between two transparent electrodes. A polarized illumination beam is directed through the liquid crystal layer to the dielectric mirror. An input image of low intensity light, such as that generated by a cathode ray tube, is applied to the photoresponsive layer, thereby switching the electric field across the electrodes from the photoresponsive layer onto the liquid crystal layer to activate the liquid crystal. Linearly polarized illumination light passing through he liquid crystal layer and reflecting from the dielectric mirror is polarization modulated in accordance with the image on the photoresponsive layer. This reflected light is analyzed by a polarizer, which transmits the image bearing component of the reflected light and reflects the other components of the light reflected by the light valve. Therefore, the light valve can be employed to convert a high resolution input image, focused onto the photoresponsive layer, into a replica which can be projected with magnification to produce a high brightness image on a viewing screen.

Insofar as is known to applicant, there are presently no projection systems on the market today using a single liquid crystal light valve with full color capability. All available light valve projector systems known to applicant have required three liquid crystal light valves, one for each of the three primary color images, for full color imagery.

It would therefore be an advance in the art to provide an optical arrangement which can be effectively employed with a single light valve to produce full color images.

It would be advantageous to provide a prism assembly for a single light valve projection system which provides the light valve with three illumination beams and forms three output projection beams which may be directed to a projection lens system for convergence at a projection aperture.

SUMMARY OF THE INVENTION

A full-color projection system is disclosed, wherein a single light valve is employed to modulate red, green and blue illumination beams in accordance with the respective primary color components of the image. Separate but proximately located red, green, and blue output projection beams are provided by a prism assembly. First, second and third periscope elements are provided to separate the projection beams at the output of the prism assembly and direct the separate respective beams into first, second and third telecentric projection lens. Each periscope includes a pair of parallel reflecting surfaces arranged for operation at angles of incidence of 45° to the projection axis so as to separate the respective beams. To obtain convergence of the separated beams, the projection lenses are designed to accommodate slightly larger object sizes than the actual size, and then shifted slightly off-center image to compensate for the separation distance.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

The present invention comprises improvements to single light valve full-color projectors. The following description is presented to enable a person skilled in the art to make and use the invention, and is provided in the context of a particular application and its requirements. Various modifications to the preferred embodiment may be readily apparent to those skilled in the art, and the generic principles defined herein may be applied to other embodiments and applications. Thus, the present invention is not intended to be limited to the embodiment shown, but is to be accorded the widest scope consistent with the principles and novel features disclosed herein.

Figure 1:
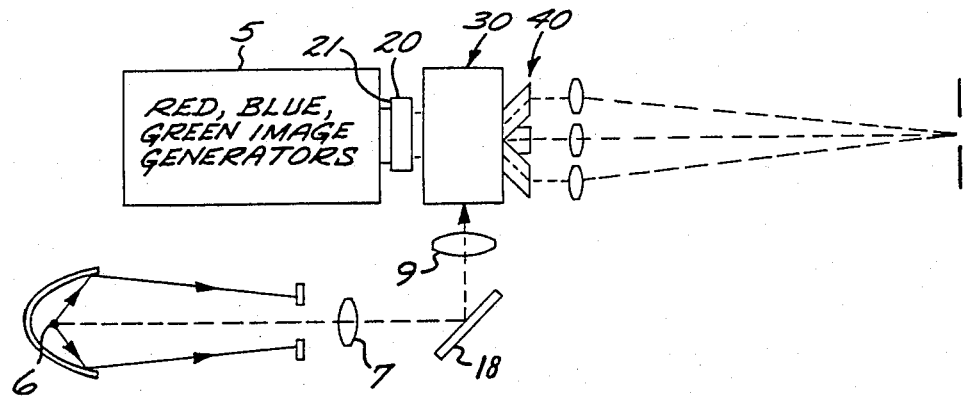
FIG. 1 is a simplified schematic block drawing illustrating a full color, single light valve projector employing the invention.

Referring first to FIG. 1, a simplified block diagram of the components of a single liquid crystal light valve, full-color projector system employing the invention is illustrated. The system includes a single liquid crystal light valve 20, comprising a photoresponsive layer. Three separate regions of the photoresponsive layer of the light valve 20 are illuminated by respective images generated by the generators 5, which images represent the primary color components of the full color image to be projected.

Prism assembly 30 is adjacent the light valve 20, and is adapted to illuminate the light valve with light of the three separate primary colors. As described more fully below, the prism assembly 30 polarizes the illumination light, separates it into separate beams of the three primary colors, and directs the respective beams to three separate regions of the light valve, in registration with the information images which are produced by the image generators 5.

The output projection light from the prism assembly is imaged by a periscope and projection lens assembly 40 to a projection aperture.

Figure 2:
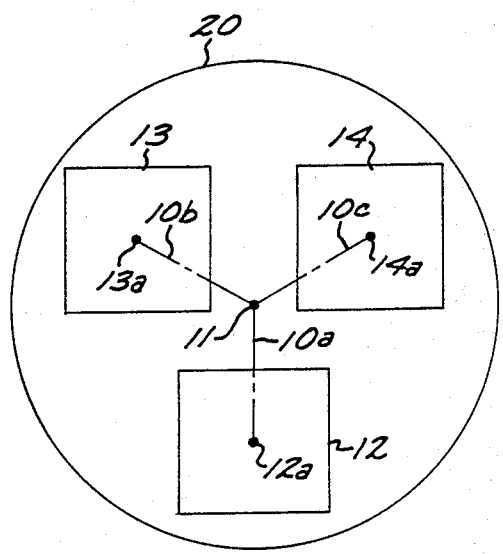
FIG. 2 is a diagram illustrating the layout of the red, green and blue input images on the single light valve.

The image generators 5 are adapted to provide three separate input images representing the green, blue and red components of the full color image to be optically coupled to the photosensitive layer of the light valve 20 in spatial separation, as illustrated in FIG. 2. For the disclosed embodiment, each image is 0.6 inches by 0.6 inches, disposed on equidistant radial lines 10a, 10b and 10c extending from the optical axis 11. The rectangle 12 represents the input red image, rectangle 14 represents the input green image, and the rectangle 13 represents the input blue image.

Image generators 5 for generating the primary color images are known in the art, and may comprise, for example, three small cathode ray tube (CRT) display devices coupled to the light valve 20 with fiberoptic couplers, or by a single CRT with three small images written either sequentially or with a single high resolution raster that contains the information for all three images. The particular means by which the three primary color information images are generated and coupled to the single light valve per se do not comprise novel aspects of the invention. Accordingly, additional specific details concerning the image generators 5 are omitted from this description so as not to obscure the novel aspects of the invention.

The illumination light for the projector system is provided by reflector 6, having an 8-degree cone angle (half-angle) which images the light from an arc lamp source 6 to a 0.25-inch diameter aperture. A 1:4 illumination relay comprising lens elements 7 and 9 images telecentric light to the aperture of the light valve 20. The illumination relay magnifies the image by a factor of four and reduces the cone angle by the same factor to 2 degrees. The cold mirror 8 removes most of the infrared radiation.

Figure 3:
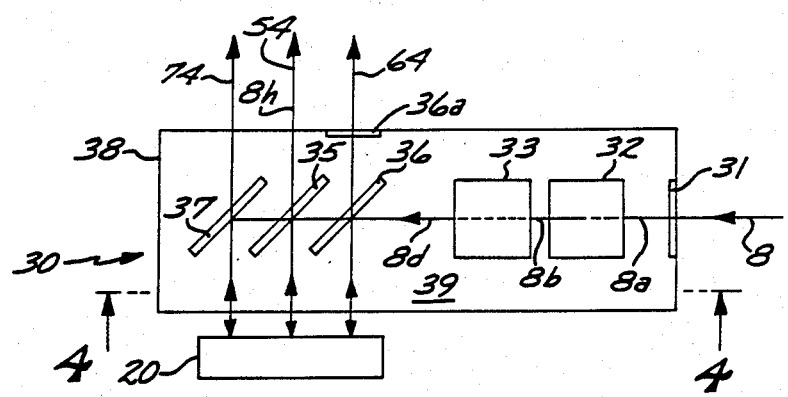
FIG. 3 is a top schematic view of the preferred embodiment of a three-color prism assembly in accordance with the invention.
Figure 4:
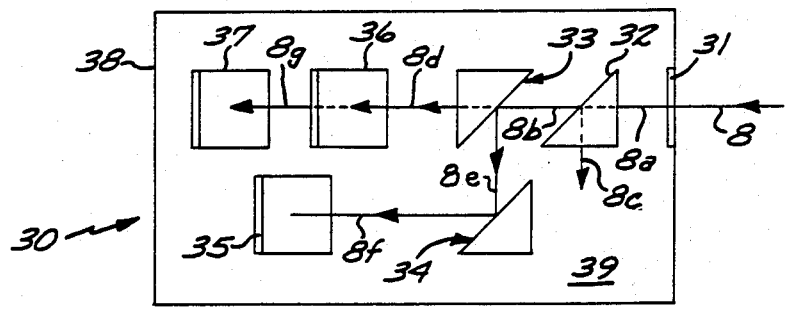
FIG. 4 is a side schematic view of the three-color prism assembly of FIG. 3.
Figure 5:
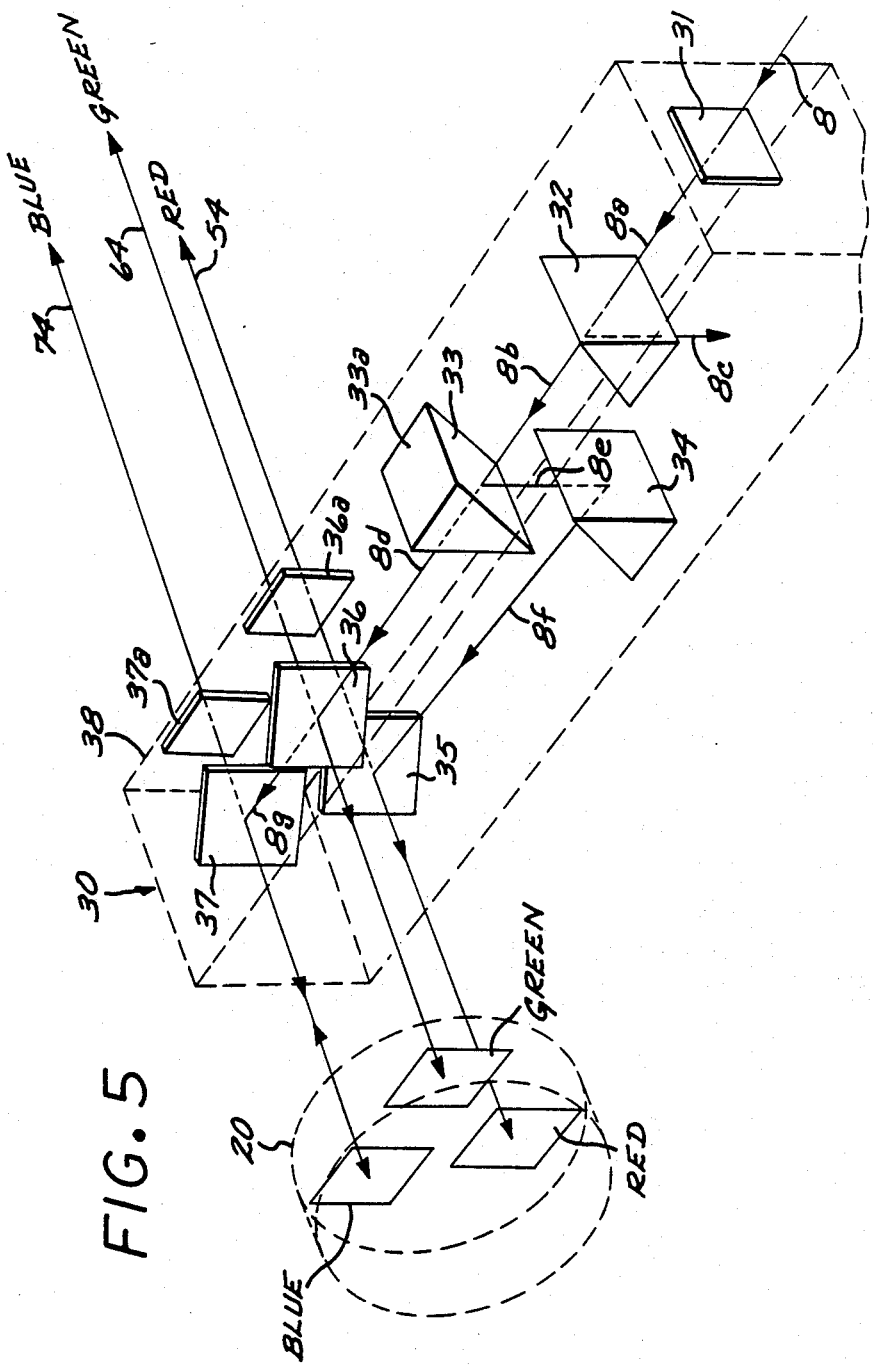
FIG. 5 is a perspective view of optical elements of the thread-color prism assembly.

Referring now to FIGS. 3–5, the prism assembly 30 is illustrated in further detail. The optical components of the prism assembly are mounted in fixed position in a housing 38 suitable for holding optical grade oil. The particular method for mounting these components is per se not considered a novel aspect of the invention, as various techniques are known in the art, such a the use of grooves and posts, adhesives and/or premolded constructions.

The top schematic view of FIG. 3 shows the location of the prism assembly 30 in relation to the light valve 20. The light valve is mounted within 0.1 to 0.2 inches of the housing 38 in the disclosed embodiment. The side view of FIG. 4 illustrates the manner by which the incident light is split into the three primary components.

The illumination light is provided to the prism assembly 30 along axis 8. The unpolarized incident illumination first passes through an ultraviolet (UV) rejection filter 31. The UV filter is adapted to transmit visible light and to reflect or absorb light in the UV wavelength range. A thin-film UV reflector on a UV absorbing substrate, such as the Schott GG 395 filter, may be employed. With light incident on the filter 31 at an angle of incidence of 0°±2° in air, the filter should transmit less than 1% of the incident light in the wavelength range between 250 nm and 415 nm, and to transmit greater than 99% of the incident light in the visible wavelength range between 415 nm and 685 nm.

After passing through the UV filter 31, the illumination light passes along optical axis 8a to a 45-degree broadband prepolarizing beam splitter 32 which removes most of the S-polarized white light, the S polarized light being reflected off the prepolarizer 32. The purpose of prepolarizer filter 32 is to transmit white P-polarized light and to reflect white S-polarized light. To achieve this performance, the filter 32 employed in the preferred embodiment employs eight sets of layers on glass, each set having a first layer having a thickness of a 0.609 quarter wavelength (of the design optical thickness) of a material having an index of refraction of 1.92, a second layer having a thickness of 1.713 quarter wavelengths of material having an index of refraction of 1.35, and a third layer having a thickness of a 0.609 quarter wavelength length of a material having an index of refraction of 1.92. This construction is at an optical thickness $\lambda = 520$ nm.

Neodymium oxide has an index of refraction of 1.92, and cryolite has an index of refraction of 1.35. These materials satisfy the above-identified criteria for the filter 32, and may be employed in its construction. However, other materials having like indices of refraction may be utilized without departing from the spirit and scope of the invention.

The filter 32 is predicted to transmit about 99% of the P-polarized light incident at 45°±1.3° in oil in the wavelength range between 425 nm and 685 nm, and to transmit about 1% of the incident S-polarized light in the same wavelength range.

The substantially P-polarized light transmitted through prepolarizer 32 passes along axis 8b to a 45-degree red reflecting filter 33. Reflector 33 is adapted to reflect the red portion of the spectrum along axis 8e and to pass the blue and green wavelength light along axis 8d.

The red P-polarized light reflected from reflector 33 passes along the direction of the axis 8e to another red reflector 34, which is identical to reflector 33, to direct the red light in the direction of axis 8f parallel to the incident radiation.

The filter 33 is the red reflector whose purposes are to transmit blue P-polarized and green P-polarized light, and to reflect the red P-polarized light. To achieve this performance, the glass comprising the filter 33 is coated with one outer layer having a depth of a 0.902 quarter wavelength of a material having an index of refraction of 2.32, two sets of layers, each set including a first layer having a thickness of a 0.604 quarter wavelength of a material having an index of refraction of 2.32, a second layer having a thickness of 1.505 quarter wavelengths of a material having an index of refraction of 1.55 and a third layer having a thickness of a 0.604 quarter wavelength of a material having an index of refraction of 2.32.

This is followed by ten sets of layers, each set including a first layer having a thickness of a 0.567 quarter wavelength and an index of refraction of 2.32, a second layer having a thickness of 1.414 quarter wavelengths and an index of refraction of 1.55, and a third layer having a thickness of a 0.567 quarter wavelength of a material having an index of refraction of 2.32. The ten sets of layers are then followed by two sets of layers, each set including a first layer having a thickness of a 0.604 quarter wavelength of a material having an index of refraction of 2.32, a second layer having a thickness of 1.505 quarter wavelengths of a material having an index of refraction of 1.55, and a third layer having a thickness of a 0.604 quarter wavelength of a material having an index of refraction of 2.32. This set of two layers is followed by a layer having a thickness of a 0.902 quarter wavelength of a material having an index of refraction of 2.32, next to the glass comprising the filter.

For this filter 33, titanium dioxide, with an index of refraction of 2.32, and lanthunium fluoride, with an index of refraction of 1.55, may be employed. This filter 33 is constructed for operation with a 45° angle of incidence and an optical thickness $\lambda = 620$ nm. The filter 33 is predicted to transmit about 99% of the P-polarized light in the wavelength range between 425 nm and 570 nm, about 2% of the P-polarized incident light in the wavelength range between 610 nm and 645 nm, and about 5% of the incident P-polarized incident light in the wavelength range between 645 nm and 700 nm.

Ideally, the filter 33 should reflect the red spectrum out to 700 nm. If it cannot be made to do so, then a red rejection filter can be added to reflect any red light out of the green illumination or projection beam.

In the disclosed embodiment, the construction of reflector 34 is identical to that of filter 33, to reduce the number of different optical elements in the prism assembly. A broadband reflector could be substituted as this element, however.

The red light reflected from reflector 34 is then incident upon a 45-degree polarization sensitive red prism 35, whose function is to reflect the red S-polarized light and transmit the red P-polarized light. The red prism 35 comprises a polarizing beam splitter.

To achieve this performance, the glass comprising beam splitter 35 includes an outer layer having a thickness of a 0.968 quarter wavelength of a material having an index of refraction of 1.92. This layer is followed by two sets of layers, each set comprising a first layer having a thickness of a 0.648 quarter wavelength of a material having an index of refraction of 1.92, a second layer having a thickness of 1.822 quarter wavelengths of a material having an index of refraction of 1.35, and a third layer having a thickness of a 0.648 quarter wavelength of a material having an index of refraction of 1.92.

These two sets of layers are followed by ten sets of layers, each set including a first layer having a thickness of a 0.609 quarter wavelength of a material having an index of refraction of 1.92, a second layer having a thickness of 1.713 quarter wavelengths of a material having an index of refraction of 1.35, and a third layer having a thickness of a 0.609 quarter wavelength of a material having an index of refraction of 1.92.

These ten sets of layers are followed by two sets of layers, each set including a first layer having a thickness of a 0.648 quarter wavelength of a material having an index of refraction of 1.92, a second layer having a thickness of a 1.822 quarter wavelength of a material having an index of refraction of 1.35, and a third layer having a thickness of a 0.648 quarter wavelength of a material having an index of refraction of 1.92. The two sets of layers are followed by a layer next to the prism glass having a depth of 0.968 quarter wavelength of a material having an index of refraction of 1.92. Neodymium oxide, with an index of refraction of 1.92, and cryolite, with an index of refraction of 1.35, may be employed to construct beam splitter 35.

The beam splitter 35 is designed for an angle of incidence of $45° \pm 1.3°$ (in oil) and an optical thickness $\lambda = 690$ nm. The filter is predicted to transmit about 99% of the incident P-polarized red light in the wavelength range between 580 nm and 685 nm, and to transmit about 1% of the incident S-polarized light in the same wavelength range.

The plane of the beam splitter 35 is rotated 90 degrees about the optical axis 8f with respect to the plane of the preceding filter 34, so that the red P-polarized light reflected by filter 34 is now oriented as S-polarized radiation relative to the plane of the beam splitter 35. This red S-polarized light is reflected by the beam splitter 35 into the light valve 20, in optical alignment with the region illuminated by image 12 in FIG. 2. For the "on" state of this region of the light valve, the red S-polarized illumination beam is reflected off the light valve 20 with opposite polarization as P-polarized projection light. For the null state, the light is reflected from the light valve with the same polarization sense, S-polarized. Red P-polarized light passes through the red beam splitter 35, and passes as output projection light, as depicted in FIG. 5, to the periscope assembly 40. S-polarized red light is reflected by the beam splitter 35, and does not reach the periscope assembly 40.

The green and blue light are separated in a similar manner. The red filter 33 reflects the red light along path 8e, and transmits the green and blue wavelength light along optical axis 8d to a green beam splitter 36. The green beam splitter 36 and the following blue beam splitter 37 are polarizing beam splitters which reflect the S-polarized light and transmit the P-polarized light. In addition, the green beam splitter 36 transmits blue S-polarized light.

The planes of the beam splitters 36 and 37 are rotated 90° about the optical axis 8d with respect to the filters 32 and 33 and are oriented parallel to the plane of beam splitter 35.

The purpose of filter 36, the green beam splitter, is to transmit the green and blue P-polarized incident light and to reflect the green S-polarized incident light. The construction of the coatings of beam splitter 36 is similar to that described for the red beam splitter 35, except that the optical thickness $\lambda = 620$ nm.

The filter 36 is designed for an angle of incidence of $45° \pm 1.3°$ in oil. The filter is predicted to transmit about 99% of incident light in the wavelength range between 500 nm and 585 nm, to transit about 95% of the S-polarized light in the wavelength range between 425 nm and 505 nm, and to transmit about 1% of the incident light in the wavelength range between 515 nm and 585 nm.

The green illumination light incident along optical axis 8d is S-polarized relative to the plane of beam splitter 36, and is reflected by the green beam splitter 36 onto the light valve 20 in optical alignment with the location of the green image 13 as shown in FIG. 2. With the light valve in the "on" state, the green light will be reflected as P-polarized green projection light to the green polarizer 36 and is transmitted through the polarizer. For the null state of the light valve, the green S-polarized light is reflected from the light valve as S-polarized light which is reflected by the polarizer 36.

The blue polarized illumination light is transmitted by the green beam splitter 36 along optical axis 8g to the blue beam splitter 37, where it is reflected as S-polarized light (relative to beam splitter 37) to the light valve 20 in optical alignment with the location of the blue input image 14 as shown in FIG. 2. With light valve 20 in the "on" state in the region, the blue S-polarized light will be reflected as P-polarized blue projection light. This reflected blue light is then transmitted by the beam splitter 37 to the periscope assembly 40. With the light valve in the null state, the blue light will be reflected as S-polarized light, which is reflected by the beam splitter 37.

The purpose of filter 37 is to transmit blue P-polarized incident light and to reflect blue S-polarized incident light. To achieve this performance, the glass comprising the prism 37 is coated with ten sets of layers, each set comprising a first layer having a thickness of a 609 quarter wavelength of a material having an index of refraction of 1.92, a second layer having a thickness of a 1.713 quarter wavelengths of a material having an index of refraction of 1.35, and a third layer having a thickness of a 0.609 quarter wavelength of a material having an index of refraction of 1.92.

The filter is adapted for an angle of light incidence of 45°±1.3° in oil, with an optical thickness $\lambda=405$ nm. The filter is predicted to transmit about 99% of the incident P-polarized light in the wavelength range of 425 nm to 510 nm, and to transmit about 1% of the S-polarized incident light in the same wavelength range.

Each of the filters 32–37 are designed to work at an angle of incidence of 45 degrees in order to facilitate packaging the several components into a single closed housing 38. The housing 38 is filled with an index-matching oil 39 (Cargille #1074), whose index of refraction 1.55 matches that of the glass comprising the filters. Filters 32, 35, 36 and 37 are fabricated on the glass BaLF5, having an index of refraction of 1.55.

The polarizing filters 32 and 35–37 are designed for operation with the light incident at near the Brewster condition at the high to low index interfaces of the quarter wave stacks of coatings comprising these filters. This maximizes the P polarization transmission while keeping the S polarization reflection quite high.

The purpose of filter 36a, the blue rejector at the output of the green channel, is to remove any blue light leaving the green channel. This filter can be applied to the output window of the prism housing. The filter reflects blue P-polarized and S-polarized light. To achieve this performance, the glass comprising the filter 36a is coated with two inner sets of layers, each set including a first layer having a thickness of a 0.466 quarter wavelength of a material having an index of refraction of 2.32, a second layer having a thickness of a 0.932 quarter wavelength of a material having an index of refraction of 1.46, and a third layer having a thickness of a 0.466 quarter wavelength of a material having an index of refraction of 2.32. These two sets of layers are topped by seven sets of layers, each set including a first layer having a thickness of a 0.5 quarter wavelength of a material having an index of refraction of 2.32, a second layer having a thickness of one quarter wavelength of a material having an index of refraction of 1.46, and a third layer having a thickness of a 0.5 quarter wavelength of a material having an index of refraction of 2.32.

The seven sets of layers are then topped by two sets of layers, each set comprising a first layer having a thickness of a 0.466 quarter wavelength of a material having an index of refraction of 2.32, a second layer having a thickness of a 0.932 quarter wavelength of a material having an index of refraction of 1.46, and a third layer having a thickness of a 0.466 quarter wavelength of a material having an index of refraction of 2.32.

Titanium dioxide, with an index of refraction of 2.32, and silicon dioxide, with an index of refraction of 1.46, are suitable materials which may be employed as layers comprising filter 36a.

The filter 36a is adapted for an angle of incidence of 0°±1.3° in oil, with an optical thickness $\lambda=420$ nm. It is predicted to transmit about 1% of the incident light in the wavelength range between 425 nm and 475 nm, about 20% of the incident light in the wavelength range between 475 nm and 490 nm, and about 99% of the incident light in the wavelength range between 510 nm and 600 nm.

FIG. 5 illustrates the physical layout of the prism assembly. Tilted plates are employed for the color-tuned polarizers (filters 35, 36 and 37). The prepolarizer 32 and the red reflectors (filters 33 and 34) comprise glass wedges. The upper red reflector wedge 33a is made with low birefringence glass to minimize any depolarization of the blue and green channel light.

The details provided above concerning the construction of filters 31–37 are exemplary only. Of course, it is possible to configure other filter arrangements which may be employed to practice the invention.

The respective path lengths for the red, green and blue illumination light beams are not identical in the disclosed embodiment. The path length difference, however, does not appear to degrade the optical performance significantly. The respective optical path lengths for the output projection light beams are identical in the disclosed embodiment.

The periscope assembly 40 disclosed in FIG. 1, and shown in greater detail in FIGS. 7–10, separates the output projection light from the prism assembly 30 so that wide angle projection lenses can be used to project these images onto the screen. The periscopes 50, 60, 70 thus provide a means to optically converge the three images directly using three telecentric projection lenses, and allows for the separation of the images with minimum increase in the total optical path for the image light.

A feature of this aspect of the invention is that rays from the object passes nearly axially through the projection lenses so that there is little resolution loss with the projection lenses. Moreover, the separation between the images takes place after polarization selection of the projection light so that any stress birefringence in the periscopes has no effect on the image quality because these periscopes are located after the polarizers.

Figure 8:
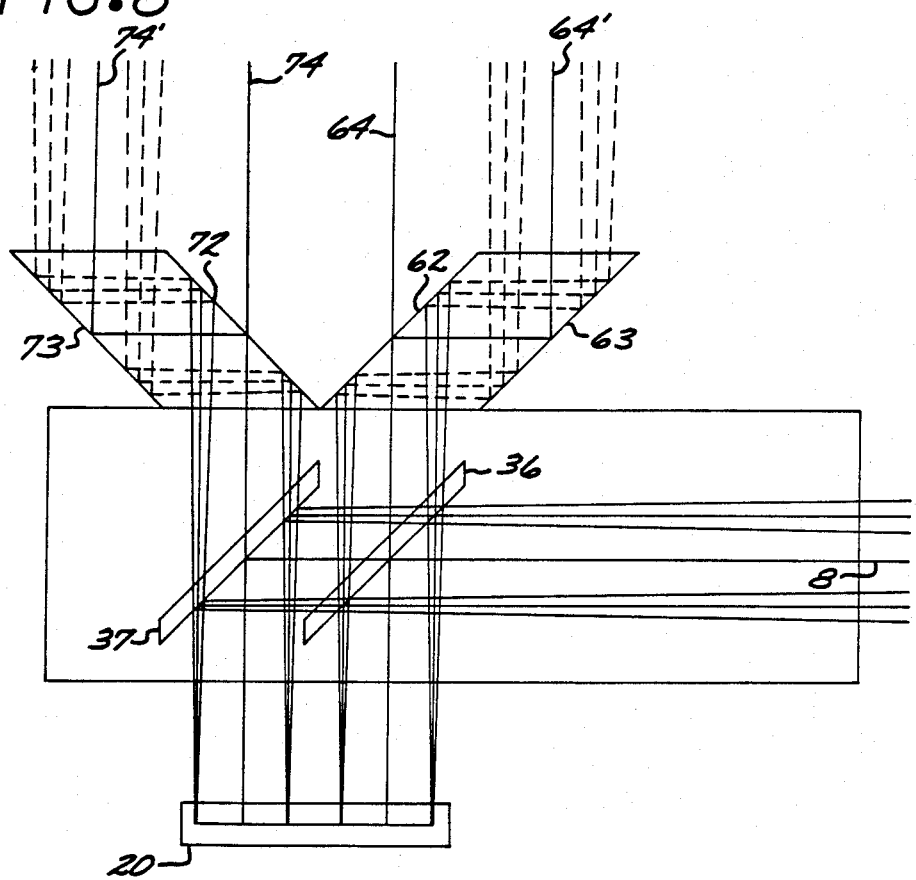
FIG. 8 is a top view of the prism and periscope assembly illustrating the paths of certain blue and green illumination and projection light rays through the prism assembly the light valve, and the periscope assembly.
Figure 9:
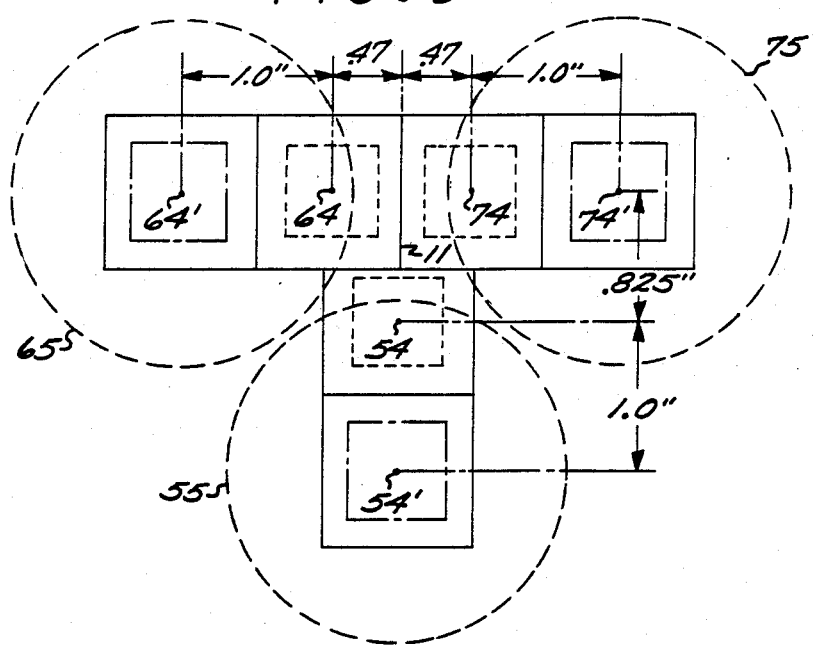
FIG. 9 is a side view illustrating the periscope assembly and projection lenses.

Each periscope 50, 60, 70 is mounted in optical alignment with the respective output projection beam 54, 64, 74 from the prism assembly 30. FIG. 8 illustrates this alignment for the blue and green channels. To achieve an optically transparent interface, the facing surfaces 51, 61, 71 of the periscopes 50, 60, 70 are mounted in contact with the exit window of the prism assembly 30, with a coating of index-matching oil applied to the interface to avoid an air interface.

Figure 7:
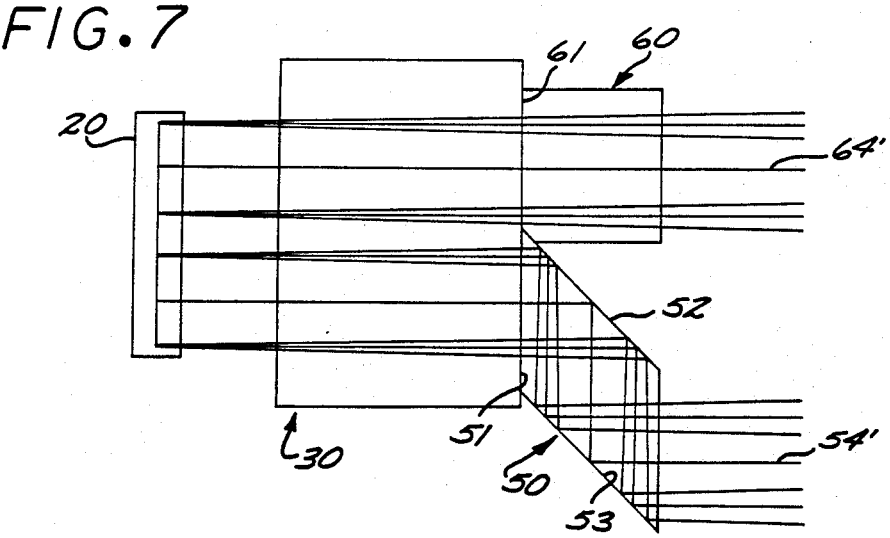
FIG. 7 is a side view of the prism housing and periscope assembly illustrating the path of certain projection light rays through the light valve, the prism assembly and the periscope assembly.
Figure 10:
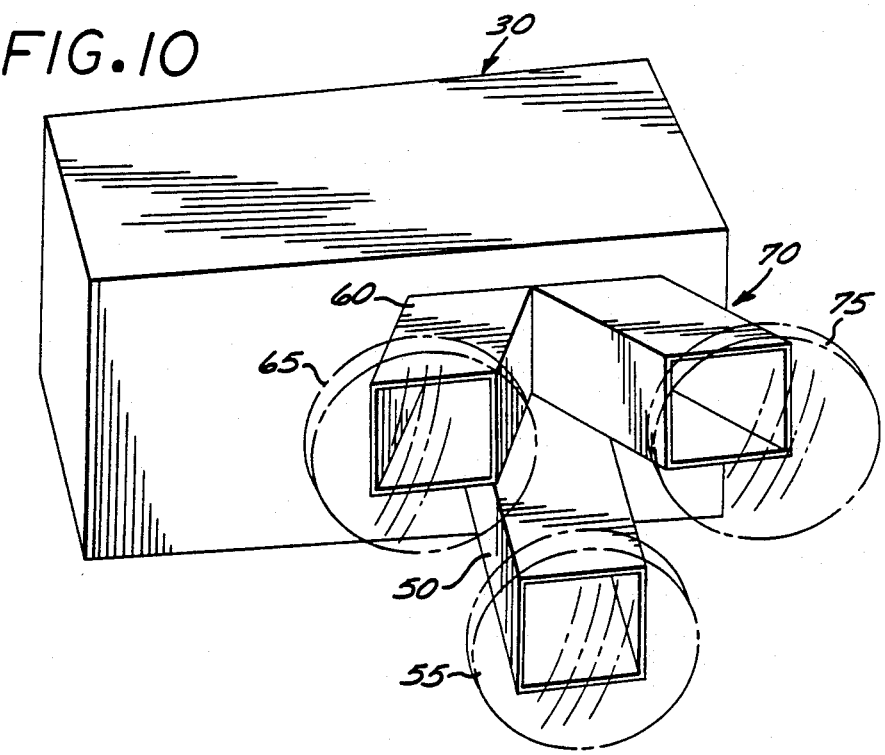
FIG. 10 is a front perspective view of the prism housing, periscope assembly and projection lenses.

FIG. 7 shows a side view of the light valve 20 prism assembly 30 and the periscopes 50, 60, 70. The lower periscope 50 directs the red channel light downwardly, away from the other two channels. FIG. 8 is a top view showing the separation of the blue and green channel images by the periscopes 70, 60. FIG. 10 is a front perspective view of the prism and periscope assembly, showing the projection lenses 55, 65, 75.

The periscopes 50, 60, 70 are fabricated from glass and employ total internal reflection to transmit the images through the periscopes without any losses at the reflecting surfaces. To obtain total internal reflection, a glass is used with an index of refraction that is not less than 1.5 in order to pass all the cone rays of the projection light. BK7 is a standard type of glass, and with an index of 1.51 is an excellent choice of material for the periscopes.

Each periscope comprises a true parallelogram in that each is formed with 45° angles, so that the two parallel reflecting surfaces are disposed at 45° with respect to the optical axis of the respective output projection light from each channel. Thus, for periscope 50, surfaces 52, 53 comprise the parallel reflecting surfaces. For periscope 60, surfaces 62, 63 comprise the parallel reflecting surfaces. For periscope 70, the surfaces 72, 73 comprise the parallel reflecting surfaces.

The use of 45° angles in the construction of the periscopes 50, 60, 70 also results in compact structures, minimizing the additional optical path length resulting from the use of the periscopes. A further advantage of the 45° angle construction of the periscopes is that each periscope may be fabricated from a pair of right angle 45° prisms. Such prisms are readily available, and by mounting two such prisms such that their long sides are disposed opposite to one another in parallel relation, the parallelogram configuration is obtained.

The three output images are separated by the respective periscopes 50, 60, 70. The periscopes 60, 70 shift the green and blue images apart from one another by a distance equal to twice the aperture size of each periscope. Thus, if periscope 60 has a one inch aperture at surface 61, periscope. 60 shifts the green projection image one inch away from the green projection image axis 64 of the prism assembly to the periscope 60 image axis 64'. The periscope 70 shifts the blue projection image one inch away from the blue projection image axis 74 of the prism assembly to the periscope 70 image axis 74'. The periscope 50 shifts the red projection image one inch away from the red projection image axis 54 of the prism assembly to the periscope 50 image axis 54', in a direction normal to the direction of the shifts caused by the periscopes 60, 70.

As a result of the respective image separation, wide angle telecentric projection lenses 55, 65, 75 may be employed to converge the three images at a projection aperture or screen. These projection lenses typically have a magnification factor of 70× to 100×. The use of separate projection lenses in this case results in reduction in aberations to the projection images, since the chief projection light rays from the periscopes are nearly on-center with respect to the center axis of the projection lenses. This results in improved optical performance over other arrangements employing a single converging lens.

The insertion of the periscopes 50, 60, 70 as part of the optical system does increase the optical path length for the respective projection images between the light valve and the respective projection lenses. This increase in the optical path length also increases the back focal length of the projection lenses. With the improved performance achieved by the telecentric lenses, this is an acceptable trade-off.

Figure 6:
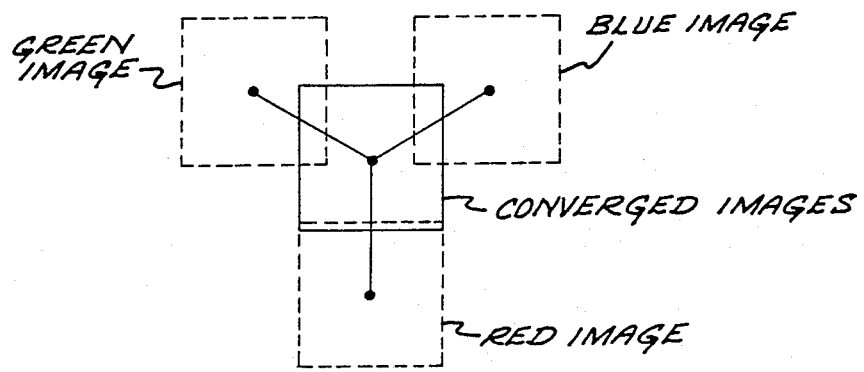
FIG. 6 is an image diagram illustrating the relative position of the red, green and blue images before and after convergence.

The images projected on the screen will be offset by the same amount as they are when they exit the three periscopes. In order to converge the three channels as illustrated in FIG. 6, the images must first be overlapped optically. Because the light valve images are magnified by the projection lenses by at least 70× to 100×, only a small shift in the position of the projection lenses is needed to overlap the projected images. For example, for 70× magnification of an image measuring 0.6 by 0.6 inches at the output of a periscope, the projected image would be 42 by 42 inches square. FIG. 10 illustrates the amount of projected image movement required to overlap the three channels. The axis 64', 74' are each horizontally offset by 1.47" from the optical axis 11 of the converged image. Dividing this distance by 70, the largest amount of translation required is 0.021 inches horizontally for the blue and green projection lens and 0.0105 inches vertically for all three lenses. This is a relatively small amount of displacement and can be easily accommodated by designing the projection lens to accommodate a slightly larger object size, e.g., with a diameter of 1.12 inches.

The assembly disclosed in the drawings enables the insertion of the three projection lenses external to the prism assembly housing 30. Alternatively, the periscope assembly could be placed within the fluid filled housing. In this case, total internal reflection would no longer occur and either a silver, aluminum or thin-film interference coating would be applied to the two reflecting surfaces of each periscope in order to reflect the light out of the housing.

A compact, full-color optical projector has been disclosed, employing a prism assembly and a periscope assembly. The prism assembly enables the illumination of a single light valve with three separate polarized primary color illumination images. The input light is both polarized and color separated by the beam splitters in the prism assembly. All the beam splitter elements are mounted in one housing, which is liquid filled with index matching liquid to prevent stress birefringence and remove any astigmatic effects which tilted plates or prisms in air would normally introduce.

The periscope assembly allows for separation of the output images of the prism assembly, with minimum increase in the total optical path for the image light, enabling the use of three telecentric projection lens for both projection and convergence of the three images. With this arrangement, the separation of the images takes place after polarization selection of the projection light, so that any stress birefringence in the periscopes has no effect on the image quality because these periscopes are located after the polarizing beam splitters, not between cross polarizers.

It is understood that the above-described embodiment is merely illustrative of the many possible specific embodiments which can represent principles of the present invention. Other arrangements may readily be devised in accordance with these principles by those skilled in the art without departing from the scope of the invention.

What is claimed is:

1. A full-color projections system employing a single crystal light valve, comprising:
    a source of an illumination light;
    an optical assembly for polarizing and color separating the illumination light into respective first, second and third illumination beams having first, second and third color components respectively of a first polarization state, said optical assembly comprising prism assembly means for directing the first, second and third beams to first, second and third regions respectively of the light valve and for reflecting and processing respective beams reflected from said light valve to provide first, second and third output projection beams along individual optical axes in a substantially contiguous relationship;

first, second, and third telecentric projection lens means for respectively projecting the first, second and third output projection beams to a projection aperture; and beam separating means comprising first, second and third periscope means interposed between said projection lens means and said optical assembly for separating the first, second and third output projection beams respectively to obtain optical alignment thereof with said projection lens means each of said respective periscope means comprising parallel first and second reflecting surfaces arranged at substantially 45° angles with respect to the individual optical axes of said optical assembly.

2. The system of claim 1 wherein said first, second and third telecentric projection lens means each comprise a telecentric wide-angle projection lens those respective back focal lengths correspond to the optical path lengths from the light valve to the respective projection lens means.

3. The system of claim 1 wherein said beam separating means is operable to shift the first, second and third output projection beams by first, second and third separation distances, respectively and wherein said telecentric projection lens means are operable to converge the first, second and third projection beams at the projection aperture.

4. The system of claim 3 wherein each of said telecentric projection lens means has a respective center axis and a magnification factor, and wherein each of said respective telecentric projection lens means is shifted off-center with respect to a respective projection axis so as to converge the respective beams at the projection aperture.

5. A full-color projection system employing a single crystal light valve and a source of an illumination light, said system comprising:

an optical assembly for polarizing and color separating the illumination light into respective first, second and third illumination beams having first, second and third color components respectively of a first polarization state, said optical assembly comprising prism assembly means for directing the first, second and third beams to first, second and third regions respectively of the light valve and for reflecting and processing respective beams reflected from said light valve to provide first, second and third output projection beams along individual optical axes in a substantially contiguous relationship; and beam projection means for separating the first, second and third output projection beams and for projecting the first, second and third output projection beams to a projection aperture.

6. The system of claim 5 wherein said beam projection means comprises: for first, second, and third telecentric projection lens means projecting the first, second and third output projection beams to said projection aperture.

7. The system of claim 6 wherein said beam projection means comprises:

first, second and third periscope means interposed between said projection lens means and said optical assembly for separating the first, second and third output projection beams respectively to obtain optical alignment thereof with said projection lens means.

8. The system of claim 7 wherein each of said periscope means comprises:

parallel first and second reflecting surfaces arranged at substantially 45° angles with respect to the individual optical axes of said optical assembly.

9. A full-color projection system employing a single crystal light valve and a source of an illumination light, said system comprising:

an optical assembly for polarizing and color separating the illumination light into respective first, second and third illumination beams having first, second and third color components respectively of a first polarization state, said optical assembly comprising prism assembly means for directing the first, second and third beams to first, second and third regions respectively of the light valve and for reflecting and processing respective beams reflected from said light valve to provide first, second, and third output projection beams along individual optical axes in a substantially contiguous relationship;

first, second, and third telecentric projection lens means for respectively projecting the first, second and third output projection beams to a projection aperture; and beam separating means comprising first, second and third periscope means interposed between said projection lens means and said optical assembly for separating the first, second and third output projection beams respectively to obtain optical alignment thereof with said projection lens means, each of said respective periscope means comprising parallel first and second reflecting surfaces arranged at substantially 45° angles with respect to the individual optical axes of said optical assembly.

* * * * *